US008826248B2

(12) United States Patent
Adendorff et al.

(10) Patent No.: US 8,826,248 B2
(45) Date of Patent: Sep. 2, 2014

(54) ENABLING COMPUTATIONAL PROCESS AS A DYNAMIC DATA SOURCE FOR BI REPORTING SYSTEMS

(75) Inventors: Michael Adendorff, Vancouver (CA); Heng Cao, Yorktown Heights, NY (US); David L. Jensen, Peekskill, NY (US); Chen Jiang, Mohegan Lake, NY (US); Tarun Kumar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/597,737

(22) Filed: Aug. 29, 2012

(65) Prior Publication Data

US 2013/0018841 A1  Jan. 17, 2013

Related U.S. Application Data

(63) Continuation of application No. 13/397,734, filed on Feb. 16, 2012.

(60) Provisional application No. 61/508,445, filed on Jul. 15, 2011.

(51) Int. Cl.
*G06F 9/45* (2006.01)

(52) U.S. Cl.
USPC .......................................................... 717/140

(58) Field of Classification Search
None
See application file for complete search history.

(56) References Cited

U.S. PATENT DOCUMENTS

| 7,904,875 B2* | 3/2011 | Hegyi ............................ 717/103 |
| 2005/0060317 A1* | 3/2005 | Lott et al. ....................... 707/10 |
| 2005/0097462 A1* | 5/2005 | Lumera et al. ................ 715/522 |
| 2006/0179421 A1* | 8/2006 | Bielski et al. ................. 717/115 |
| 2009/0018996 A1* | 1/2009 | Hunt et al. ......................... 707/2 |
| 2010/0246981 A1* | 9/2010 | Hu et al. ....................... 382/232 |

OTHER PUBLICATIONS

Oracle, "Oracle OLAP 11g AWM Plug-in", Apr. 29, 2009, Oracle. from http://www.oracle.com/technetwork/database/options/olap/awm-plugin-biee-099449.html.*
Jiang, et al., "Building Intelligence applications having Prescriptive and Predictive capabilities", Web-Age Information Management: 11th International Conference, Jul. 15-17, 2010, pp. 376-385.
http://www-03.ibm.com/press/us/en/pressrelease/32858.wss, "IBM Unveils New Information Management and Analytics Software to Help Organizations Gain Faster Insight for Smarter Business Outcomes: Delivers Social Collaboration and Analytics for Faster Decision Making", Oct. 25, 2010.

* cited by examiner

*Primary Examiner* — Li B Zhen
*Assistant Examiner* — Sen Chen
(74) *Attorney, Agent, or Firm* — Scully, Scott, Murphy & Presser, P.C.; Daniel P. Morris, Esq.

(57) ABSTRACT

A system, method and computer program product for integrating at least one analytical or modeling driver into an existing business analytic environment. The system comprises a BAMS (Business Analytics and Mathematical Sciences) driver, implemented on the memory device and run by the processor, loads a real database driver and redirects a request from a client application to the real database driver. An extension driver, invoked by the BAMS driver, provides an interface to a data modeling or processing software and converts the interface from a software environment compiled by a programming language to another software environment targeted to another programming language. The extension driver extends or overrides functionalities of the BAMS driver. Implementing the BAMS driver and the extension driver in the existing business analytic environment do not require any change made on the existing business analytic environment.

7 Claims, 8 Drawing Sheets

ENABLING COMPUTATIONAL PROCESS AS A DYNAMIC DATA SOURCE FOR BI REPORTING SYSTEMS

CROSS REFERENCE TO RELATED APPLICATION

The present invention claims the benefit of U.S. patent application Ser. No. 13/397,734 filed Feb. 16, 2012 which claims the benefit of U.S. Provisional Patent Application No. 61/508,445 filed Jul. 15, 2011, the entire content and disclosure of which is incorporated herein by reference.

TECHNICAL FIELD

The disclosed technology is generally related to business intelligence (BI) systems, and in particular, to enabling BI systems implement prescriptive and predictive capabilities.

BACKGROUND

BI has emerged as a key driver for growth among business organizations. Numerous products and services have been rolled out by various vendors in the BI systems space. Each of these products fall into one of the following three categories: domain specific solutions, general purpose reporting tools and mathematical modeling products.

Domain specific solutions include the enterprise resource planning tools (ERP) from companies such as SAP® and Oracle®. These tools provide an out-of-the-box functionality for some key aspects of the business function and have certain well defined analytical models that help in making business decisions. The second class of products are commercial-off-the-shelf (COTS) data warehousing/reporting tools. These tools can be connected to an enterprise system to extract and reorganize transactional information into star schema type of data models. Analysts and other decision makers can then query and analyze the information to do a trend analysis, find key bottlenecks to growth or predict future demands. These tools also provide online analytical processing (OLAP) capability. The third class of products is implementation of operations research methodologies, such as statistical analysis, mathematical optimization, and simulation. These tools can be used to build mathematical models and then feed the organizational information to get specific insights, such as statistical models can be built to predict the demand for certain key seasonal products or an optimization model to efficiently map the route for delivery trucks.

Each of the three classes of products comes up short of being tagged as a true BI system. Domain specific systems only provide a small subset of BI capabilities. Their main objective is to provide efficiencies in the operational systems. The off-the-shelf data warehousing tools provide the basic extract, transform & load (ETL) functionality. They enable users to quickly transform the transactional data to create drag-drop and drill down reporting capabilities. They provide descriptive information about the enterprise, but lack the capability to provide deep analytical capabilities. The products based on operations research are stand-alone tools and it is a cumbersome task to integrate them with the operational system in terms of both time and effort.

Hence, there remains a need for an agile framework that can overcome the deficiencies of each of the three classes of systems.

SUMMARY

This disclosure describes a framework that showcases a truly integrated system having deep analytics embedded in it. Since the domain specific BI or Enterprise systems have their own proprietary architecture and interfaces, the framework efficiently enables a COTS data warehousing/reporting system with prescriptive and predictive capabilities offered by the operations research methodologies. The BI or enterprise system is used to enable a reporting dashboard capability and modeling software, such as IBM® ILOG OPL Studio, IBM® SPSS Modeler and Statistics, is used to enable an optimization and statistics/data mining models. These two set of systems are integrated together using analytical application integration framework (AAIF). This framework integrates predictive and optimization capabilities to an otherwise descriptive information platform and can be applied seamlessly to integrate a customized analytical engine to any commercial product or a custom application.

BRIEF DESCRIPTION OF THE DRAWINGS

The objects, features and advantages of the disclosed technology will become apparent to one skilled in the art in view of the following detailed description taken in combination with the attached drawings, in which.

DETAILED DESCRIPTION OF THE PREFERRED EMBODIMENTS

Delivering predictive and prescriptive capabilities from a more generic data warehousing/reporting tool is very attractive to an enterprise, since it would get the combined power to understand past, as well as suggestions of future optimized actions, all from one integrated environment. However, this is not a trivial task, as the key requirement for a BI reporting tool is to focus on effectively reporting on large and usually high dimensional data. To serve this purpose, the usual assumption is that the data is static, and only changes periodically. BI reporting tools usually won't have the infrastructure and capability to effectively take real-time user inputs and evaluate the changes in run time, which is often the case with optimization, statistics, data mining and what-if type of analysis. In order to accomplish this task, two levels of challenges need to be addressed: first from application middle tier and second from the back end tier.

From application middle tier, a technology is desired that allows the system to take end user inputs and effectively invoke the backend predictive or prescriptive models. On the backend tier, a technology is desired to provide integration between the predictive or prescriptive (PoP) model and high dimensional BI data objects, in one embodiment, designed as a star schema type of data model.

To address the first level of challenge, various BI systems implement extensions to allow plug-ins into external computational processes. A drawback of this implementation is a need for significant plug-in development effort. Further, most of the PoP modeling tools have been developed with the assumption that the tool will be used in a standalone mode. Hence, these tools do not lend themselves easily to integration within enterprise architecture. An advantage of the disclosed technology is its non-invasiveness to address this concern by building a framework that can be applied to a host of PoP modeling tools and is efficient to implement. One premise of the disclosed technology is based on the observation that all the existing BI reporting systems have data access via Structured Query Language (SQL) through database drivers implemented using interfaces, such as Open Database Connectivity (ODBC) or Java Database Connectivity (JDBC). Thus, in one embodiment, the disclosed technology enables external computational processes being exposed as dynamic data sources through standard database interfaces, such as ODBC or JDBC. These computational processes can then be consumed by existing BI reporting systems using standard SQL queries. AAIF enables an efficient interaction of a module of the PoP modeling software, such as an ILOG optimization solver, to a query data mart cube built in a BI system. The disclosed technology allows a bi-directional interaction between the two systems enabling reading and writing of optimization results back to the data mart.

The second level of challenge, which arises from the back end data integration tier, is the sheer number of analytics and optimization scenarios that can be created when the business user drills up and down along the high dimensional BI data space. Hence, it is difficult to build Pop models to address each possible scenario. Also, in real time, the very fine grained data existing in BI data warehouse makes the PoP models' computation time exorbitantly expensive. To address this issue, a meta-structure for the PoP model data is defined. In one embodiment, there is also provided an efficient binding/mapping schema between the PoP vector space and BI Star Schema's high dimensional data space. This enables an PoP model to be run on multiple scenarios regardless of the scenario being selected by the user.

Figure 1:
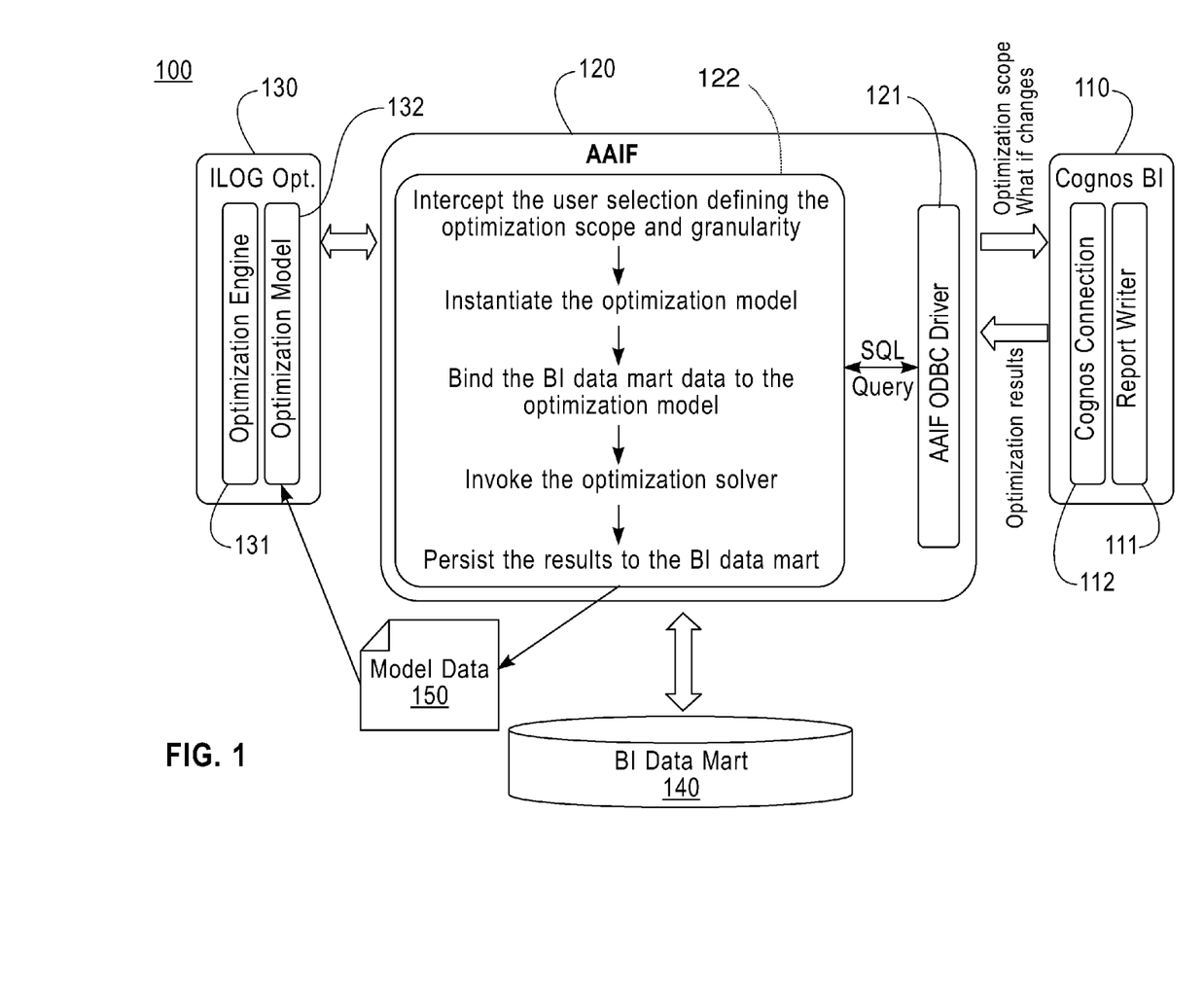
FIG. 1 symbolically shows one example of information flow in one integrated computing environment according to one embodiment of the disclosed technology.

FIG. 1 symbolically shows one example of information flow in one integrated computing environment according to one embodiment of the disclosed technology. Computing environment 100 includes a BI platform 110, AAIF 120, modeling software 130 and a BI data mart 140.

BI platform 110 provides data reporting, OLAP and dash port functionality. Among other functionalities, BI platform 110 comprises a report viewing module 111 and connectivity module 112.

Report viewing module 111 enables report viewing by providing a comprehensive set of reporting capabilities and access to the information its user needs. In one embodiment, this functionality delivers a single, Web-based, solution for all components of the reporting lifecycle. Some components include self-service reporting (enables business users to get the information they need quickly and easily without relying on IT), author once, access anywhere (enables IT to create a single report that users can access on multiple devices, in many languages, in multiple formats, and in other applications and processes) and report lifecycle (enables collaboration between business and IT by enabling the sharing of queries and reports).

Connectivity module 112 enables data input and output for BI platform 110.

Modeling software 130, such as ILOG, provides, in one embodiment, an optimization capability and generally comprises of a modeling engine, such as CPLEX engine, that runs a model 132, such as OPL optimization model, based on certain input data.

BI data mart 140 provides storage of data. In one embodiment, BI data mart 140 is a relational database, such as DB2.

AAIF 120 architecture is independent of a business problem to be solved and can be used to integrate any two component application. AAIF 120 provides an AIFF ODBC driver 121 and wrapper (not shown) to the backend optimization module and is transparent to BI platform 110 just like one of the typical data input sources. AAIF 120 helps to relieve a software developer from the integration effort and focus on the developing the optimization model using an optimization environment the software developer is familiar with.

AAIF 120 is a generic architectural software framework that helps in bringing the descriptive (such as Cognos), predictive (IBM® SPSS PASW Modeler, IBM® SPSS Statistics) and prescriptive (such as ILOG (OPL)) applications together. AAIF 120 enables an analytical engine to be integrated as a virtual data source. Data, parameters and results are exposed as a relational data source. This enables an existing data analysis/reporting platform to consume the analytical capabilities seamlessly, thus allowing a very simple integration path. AAIF 120 allows for integration of analytical models spanning a vast array of languages, such as C/C++, Java, Matlab, SAS, SPSS, PHP and Perl. The extensions built into AAIF 120 allow applications that employ it to be integrated across multiple boundaries. For example, these applications can be integrated across the Process boundaries: analytical model execution can be in-process or out-of-process; Engine boundaries: data requests can be marshaled to engines such as MATLAB, R, SPSS, SAS; Protocol Boundaries: data requests can be marshaled across web services or other protocols.

One AIFF ODBC driver sub-component of AAIF 120 is a Business Analytics and Mathematical Sciences (BAMS) ODBC driver 121, which is registered as a data source just as any other ODBC driver. This provides two dimensions of flexibility. One dimension is that it provides a proxy for another real data source through a real ODBC driver. The second dimension is that it provides a proxy for a virtual data source through a driver extension. The real data source is defined through registration of another ODBC driver and its configuration. The BAMS ODBC driver 121 is responsible for loading the real driver and redirecting calls from the client application through the real driver.

The extension driver 122 is provided by the end user and is the mechanism for adding functionality into the ODBC framework. There are several forms that the extension driver 122 can take. One form is to provide a binding into existing analytical models or data processing. Another form is one that provides a language binding by reflecting the ODBC interface from its native compiled environment through to an alternate target language, such as Java, Perl or PHP.

As BAMS ODBC driver 121 processes requests, the user extension may manipulate both the requests, prior to their submission to the real driver, as well as post-process the results of the real driver. Some of the implications of this capability are that the presence of BAMS ODBC driver 121 may augment the real data source by adding virtual tables and columns; intercept and manipulate SQL requests from the client program before sending them on to the real driver; redirect requests through other protocols and languages; provide access to base operating system features such as logging, performance monitoring, network and computational services; and provide access to capabilities provided external engines, such as MATLAB, SAS, SPSS.

In one embodiment, BAMS ODBC driver 121 receives as input, the output of BI platform 110 sent via connectivity module 112. For example, the input may be in SQL format. Upon receipt of the input, which defines a specific model scope and granular level of data desired, BAMS ODBC driver 121 interprets the input in order to determine desired performance of its task. For example, the user may want to retrieve data from BI data mart 140 or model an occurrence of a certain hypothetical optimization scenario. Further, BAMS ODBC driver 121 instantiates and invokes a model 132, which is related to the previously defined specific model scope and granular level of data desired, via a model engine 131. Additionally, BAMS ODBC driver 121 binds BI data mart 140 to model engine 131 in order to retrieve and input necessary model data 150 into model 132 via model engine 131. Upon conclusion of running model 132, performance results may be sent back, via BAMS ODBC driver 121, to report viewer module 111 via connectivity module 112 or may be cached, rather being recomputed, in BI data mart 140 for potential future retrieval.

Figure 2:
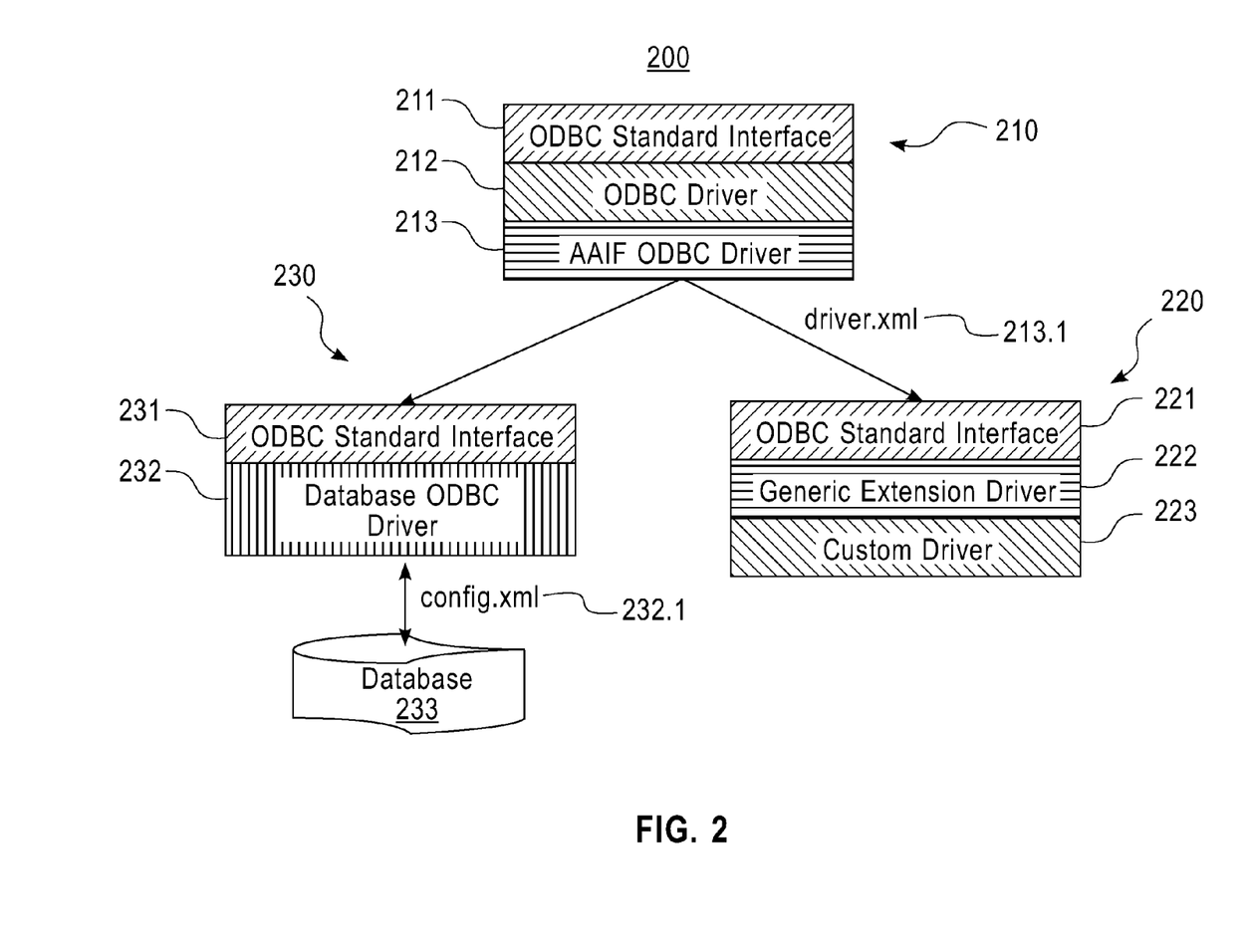
FIG. 2 symbolically shows one high-level example of an ODBC thunker driver architecture according to one embodiment of the disclosed technology.

FIG. 2 symbolically shows one high-level example of an ODBC thunker driver architecture according to one embodiment of the disclosed technology. A "thunker" is a software application or a file that allows requests from one application to be understood and interpreted by another application. ODBC driver is a component of the AAIF framework that is mostly implemented by code generated from an Extensible Markup Language (XML) encoding of the ODBC specification. An XML Schema Definition (XSD) is used for auto generation of the ODBC interface. The current code generation process uses an XML document and Extensible Stylesheet Language Transformations (XSLT) processing to generate driver code.

The default generation has two dimensions along which the core ODBC driver provides extensions. The first dimension allows the ODBC Driver to act as a proxy by providing a mechanism for deployment time registering and runtime enabling of an ODBC driver to a real database. For example, the ODBC driver provided by db2cli.d11 on a Microsoft Windows platform may be registered to provide access to a DB2 database. The second dimension provides a mechanism for passing ODBC requests in an extension library. The functionality of the extension library is not specified and is up to the software developer. One example includes a provision of optimization and analytical capabilities to augment an underlying data source. This extension capability may also be used to provide extensions to the platform that cross: language boundaries, for example to Java, PHP, or Perl; process boundaries so that analytical model execution may either be in-process or out-of-process; engine boundaries so that requests may be marshaled to engines like MATLAB, R, or other analytic engines; protocol boundaries so that requests may be marshaled across Web services or other protocols; provide control points to implement non-functional requirements such as performance monitoring, session management, and logging.

An ODBC thunker driver architecture 200 comprises a BAMS block 210, an thunker block 220 and a database block 230. BAMS block 210 comprises a first ODBC interface 211, an ODBC driver 212, a BAMS ODBC driver 213 and a runtime configuration driver 213.1. Thunker block 220 comprises an ODBC Thunker Interface 221, an extension driver 222 and a custom driver 223. Database block 230 comprises a second ODBC interface 231, a real driver 232, a configuration file 232.1 and a real database 233.

First ODBC interface 211 is operably coupled to ODBC driver 212 in order to receive and direct one or more ODBC compliant commands to ODBC driver 212. In one embodiment, ODBC first interface 212 may receive as input, such as SQL, the output of a BI platform.

An ODBC thunker driver architecture 200 comprises a BAMS block 210, an thunker block 220 and a database block 230. BAMS block 210 comprises a first ODBC interface 211, an ODBC driver 212, an AIFF (BAMS) ODBC driver 213 and a runtime configuration driver 213.1. Thunker block 220 comprises an ODBC Standard Interface 221, an extension driver 222 and a custom driver 223. Database block 230 comprises a second ODBC interface 231, a real driver 232, a configuration file 232.1 and a real database 233.

First ODBC interface 211 is operably coupled to ODBC driver 212 in order to receive and direct one or more ODBC compliant commands to ODBC driver 212. In one embodiment, ODBC first interface 211 may receive as input, such as SQL, the output of a BI platform.

ODBC driver 212 is also operably coupled to AIFF ,(BAMS) ODBC driver 213 that is registered as a data source, similarly to ODBC driver 212, and at least dually extends the functionality of ODBC driver 212. Firstly, AIFF ,(BAMS) ODBC driver 213 provides a proxy for another real data source, such as database 233, through real driver 232 and configuration file 232.1 via ODBC second interface 231. The real data source is defined through registration of another ODBC driver and its configuration. AIFF (BAMS) ODBC driver 213 is responsible for loading real driver 232 and redirecting calls from a requesting application via real driver 232 and configuration file 232.1 to real database 233. Configuration file 232.1, such as config.xml, generally describes database configuration information that is required by real driver 232, such as db2cli.dll, in order to properly operate with real database 233.

Secondly, AIFF (BAMS) ODBC driver 213 provides a proxy for a virtual data source through a driver extension via extension driver (thunker) block 220. As AIFF (BAMS) ODBC driver 213 processes requests, the user extension may manipulate both the requests, prior to their submission to the real driver, as well as post process the results of the real driver. Some of the implications of this capability are that the driver may augment the real data source by adding virtual tables and columns intercept and manipulate SQL requests from the client program before sending them on to the real driver redirect requests through other protocols and languages provide access to base operating system features such as logging, performance monitoring, network and computational services provide access to capabilities provided external engines such as MATLAB, SAS, SPSS, etc.

Runtime configuration driver 213.1, such as driver.xml, is generated at build-time and generally describes runtime configuration of AIFF (BAMS ODBC driver 213 to determine its features at runtime. Some examples of such information include instructions as to the types and versions of data analytics to load, how AIFF (BAMS) ODBC driver 213 runs at runtime, topology information, configuration information of the locality of the various parts of AIFF (BAMS) driver 213 since some parts of AIFF (BAMS) ODBC driver 213 can run on one machine and some on another.

ODBC Standard Interface 221 is operably coupled to extension driver 222 and acts as a proxy by redirecting all ODBC calls to real driver 232, provides an extension point and a data registration mechanism, is configured at runtime using an XML document and dynamically loads the associated real and extension drivers. In one embodiment, ODBC Standard Interface 221 reflects each ODBC call through a new API call by adding two parameters: current "SQLReturn" code as an encoding of the current OBDC API state and ODBC Thunker pointer to allow extension driver 222 to interact with real driver 233.

Extension driver 222 is operably coupled to ODBC Standard Interface 221 and custom driver 223. Extension driver 222 is provided by an end user (generated as an output from ODBC Standard Interface 221) and is the mechanism for adding functionality into the ODBC framework. There are several forms that the extension can take. One form is to provide a binding into existing analytics or data processing. Another form is one that provides a language binding by reflecting ODBC interface 211 from its native compiled environment through to an alternate target language, such as Java, Perl, or PHP.

Custom driver 223 is operably coupled to extension driver 222. In one embodiment, customer driver is connected to or part of modeling software. In one embodiment, if desired, custom driver 223 is customizable and responsible for overriding and implementing a specific method necessary to implement a certain application-required functionality.

In one embodiment, if queried information initially cannot be found in database 233, then a request is passed via thunker block 220 to the modeling software and an attempt is made to use the modeling software to calculate and output the queried information. Some types of information that may not be present in database 233, but queried for, for example by a BI platform, may include data concerning statistical likelihood of an occurrence of a future event or data that needs to be computed by modeling software. Such results, instead of being recomputed, may be cached in database 233 for more efficient potential future retrieval.

At least as a result of the above architecture, in one embodiment, BI platform, at the time of its outputting a certain SQL query, does not need to know where the result of that SQL query is coming from i.e. whether the data is obtained from static data in database or the data is computed on-the-fly via modeling software.

Figure 3:
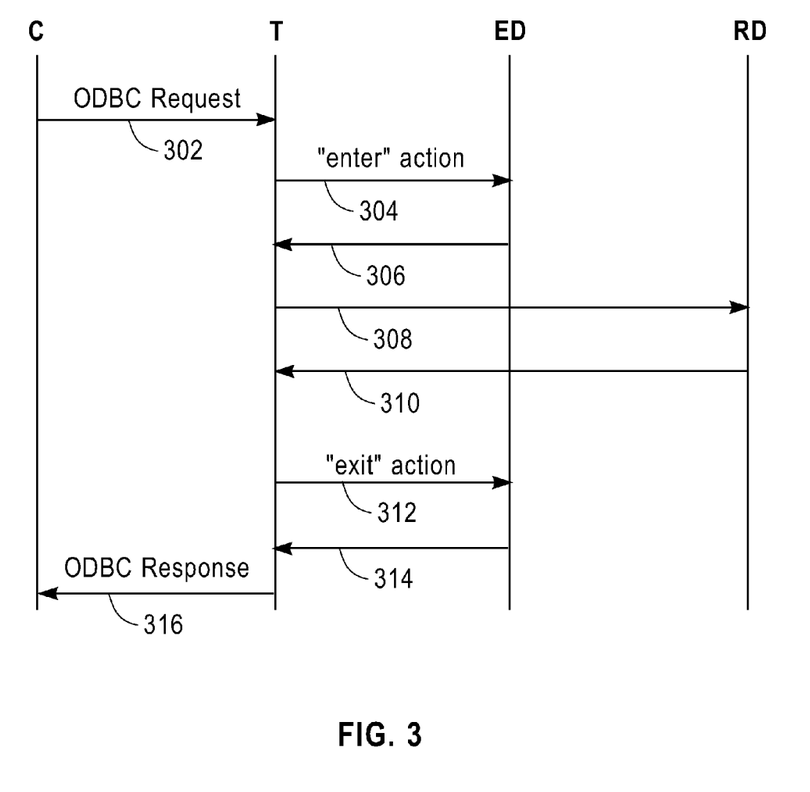
FIG. 3 symbolically shows one example of a request/response flow according to one embodiment of the disclosed technology.

FIG. 3 symbolically shows one example of a request/response flow according to one embodiment of the disclosed technology. A request/response flow 300 occurs between a client C, an ODBC Thunker T, an extension driver ED and a real driver RD.

In one embodiment, request/response flow 300 is implemented in generated C code for each of the methods within an ODBC interface. One example pattern used is one in which an initialization method is used to set up the ODBC interface. One implementation of the initialization method is used to set up indirection tables into the real driver and the extension driver at runtime on the first invocation and to do nothing on all subsequent invocations. The next call to "ODBCThunkerEnter" is used for performance monitoring and request tracking. The "ODBCThunkerCallback" call is used to invoke the corresponding extension function with additional arguments providing the current state of method call, a pointer to the methods on the real driver, and an argument indicating the current position, either on entry or exit, of the current invocation. If no "SQLError" is flagged, then the real driver method is invoked. Once again, the "ODBCThunkerCallback" call is used to give the extension driver a chance to post-process the results. Finally, "ODBCThunkerExit" method is called to finish up the performance, logging or other generic tasks.

In step 302, an ODBC request is passed from client C, such as a BI platform, to ODBC Thunker T, which manages the ODBC request and determines whether the request should be routed to a database or to modeling software.

In step 304, ODBC Thunker T implements an 'enter' action, such as using a command 'ODBCThunkerEnter,' to communicate the request for data to extension driver ED.

In step 306, extension driver ED returns a 'response' or a 'status' to ODBC thunker T. A 'response' is the requested data, and a 'status' is an acknowledgment that the request for data has been received. Extension driver ED connects ODBC thunker T to the modeling software. The modeling software can be used to calculate requested data that is not readily retrievable from the database.

In step 308, ODBC thunker T may also map the request for data to the database. ODBC thunker T communicates the 'request for real data' to real driver RD.

In step 310, real driver RD retrieves the requested data from the database and 'returns the data' to ODBC thunker T.

In step 312, upon receiving the data, either from the database or the modeling software, ODBC thunker T initiates an 'exit' action, such as using the command "ODBCThunkerExit" to extension driver ED. The exit command initiates logging and generic cleanup tasks related to the ODBC request.

In step 314, extension driver ED returns control to ODBC thunker T once all the exit tasks are complete.

In step 316, ODBC thunker T returns the information requested by ODBC request (either data from the database or data calculated by the modeling software) to client C. In one embodiment, client C may then present the requested information to a user of client C in a form of a report, chart or graph.

Figure 4:
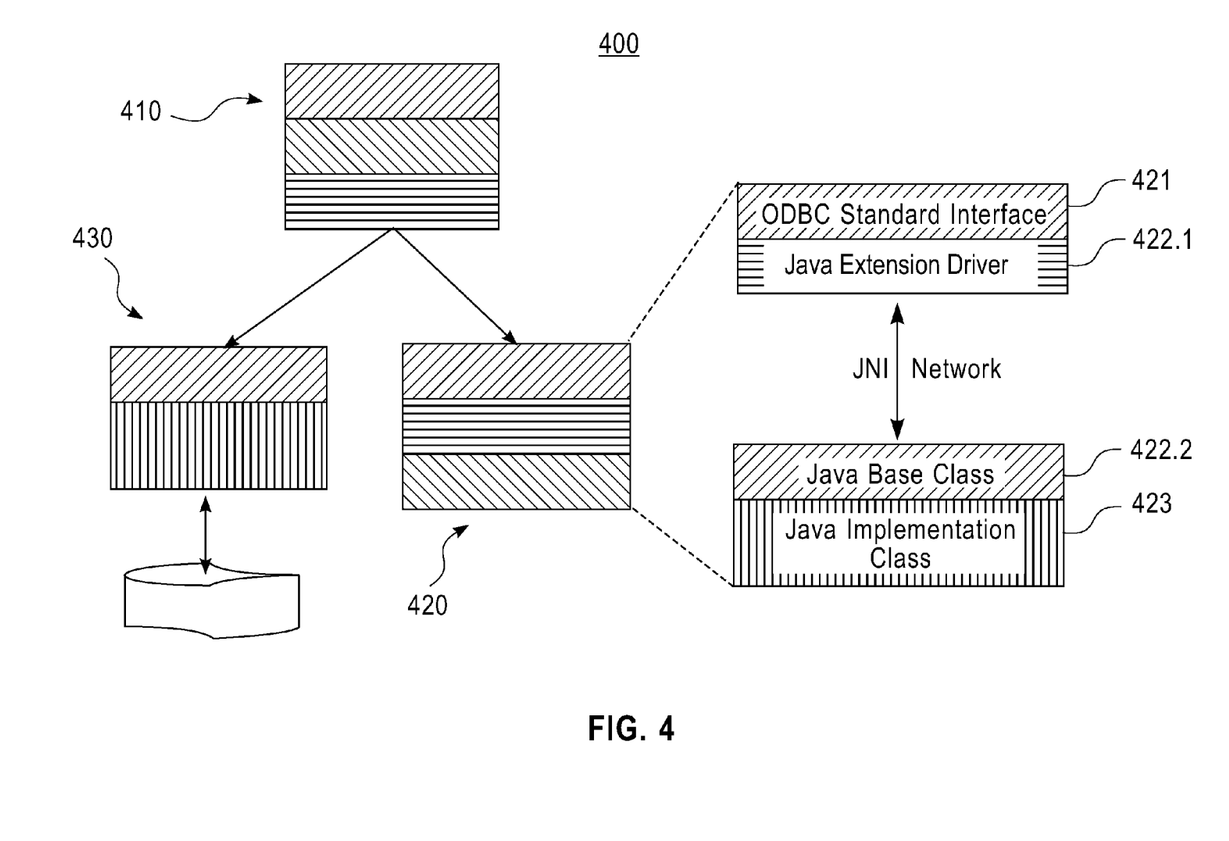
FIG. 4 symbolically shows one example of a Java extension sample custom driver architecture according to one embodiment of the disclosed technology.

FIG. 4 symbolically shows one example of a Java extension sample custom driver architecture according to one embodiment of the disclosed technology. This implementation of an extension driver has been written to support use of Java in providing functionality in implementing an application specific ODBC extension or to invoke methods of another computer programming language. In this case, both C++ and Java code is generated to automate the creation of the inter-language communication code by marshalling C code into a form which can be transmitted to backend using a language agnostic data representation. This driver binds to Java using Java Native interface (JNI) for in-process communication and a variety of network-friendly mechanisms for out-of-process communication. This driver also uses a runtime registration mechanism for specifying some properties of a Java Virtual Machine (JVM) and a Java class implementing an ODBC API function. The Java code has methods with virtually identical prototypes to their C counterparts in an ODBC API. The result is a base class providing the core functionality. The developer is responsible for overriding and implementing the specific methods necessary to implement the application required functionality.

A Java extension sample custom driver architecture comprises a BAMS block 410, an thunker (extension) block 420 and a database block 430. BAMS block 410 and database block 430 are structurally and functionally similar to BAMS block 210 and database block 230 as described in reference to FIG. 2. Thunker block 420 comprises an ODBC Standard Interface 421, a Java extension driver 422.1, a Java base class 422.2 and a Java implementation class 423.

ODBC Standard Interface 421 is structurally and functionally similar to ODBC Standard Interface 221 as described in reference to FIG. 2. ODBC Standard Interface 421 is operably coupled to Java extension driver 422.1.

Java extension driver 422.1 is specialized to a particular purpose by specifying a computer programming class name that implements certain functionality. The named class is responsible for extending a base class and overriding those ODBC methods required to accomplish its goals. Hence, Java extension driver 422.1 is operably coupled to ODBC Standard Interface 421 and deployed via JNI and/or network connection. Java extension driver 422.1 is functionally extended via Java base class 422.2 and custom written Java implementation class 423. Java extension driver 422.1 converts SQL commands passed to ODBC Standard Interface 421 into C or C++programming language compatible commands.

Figure 5:
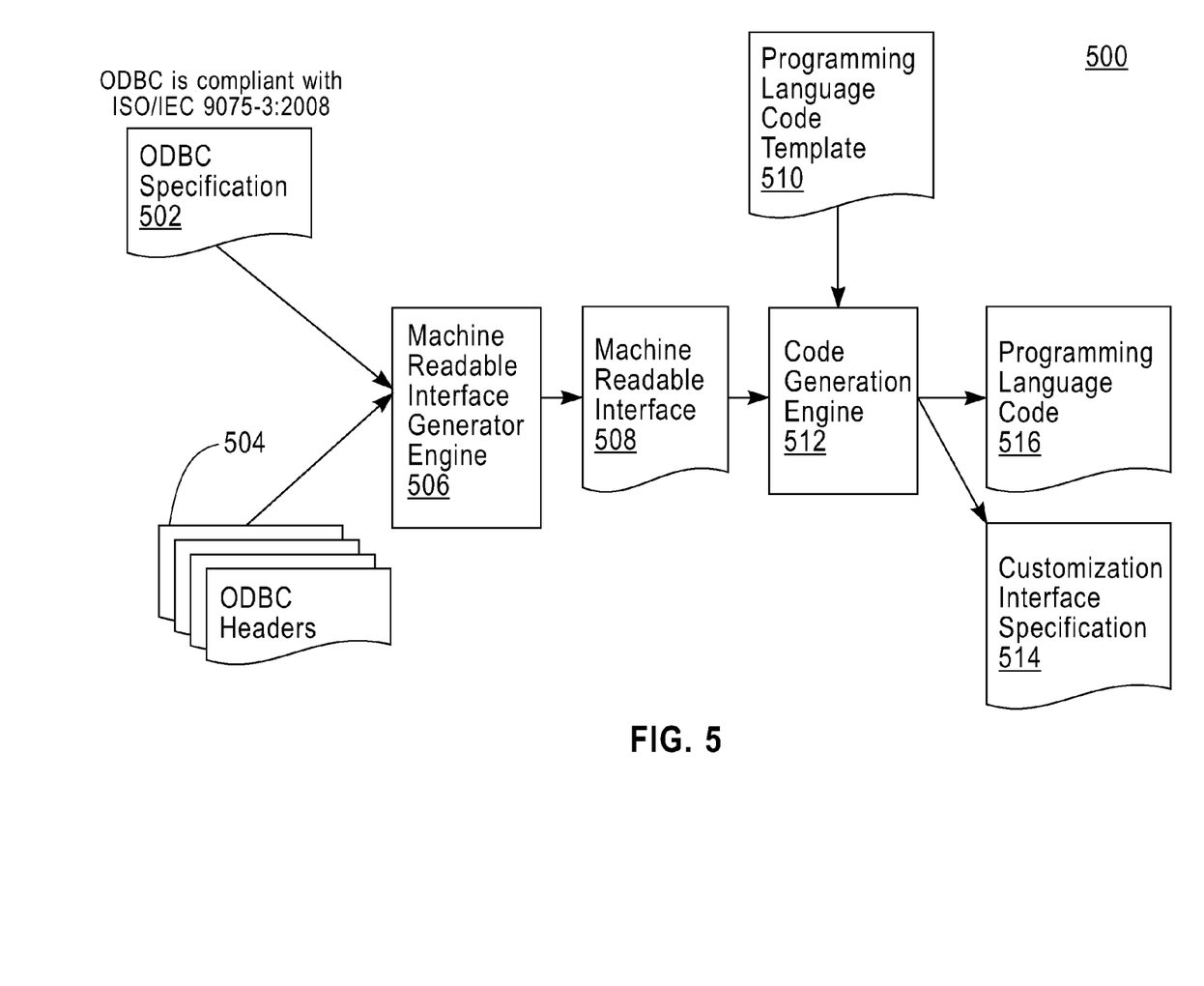
FIG. 5 symbolically shows one example of a generic build-time process of a BAMS driver according to one embodiment of the disclosed technology.

FIG. 5 symbolically shows one example of a generic build-time process of a BAMS driver according to one embodiment of the disclosed technology. Generally, a generic build-time process 500 may be used to generate any computer programming language headers. However, the description below is generally described in reference to XML and XSLT for code generation and targeting C++ language for implementation. Hence, this should not be construed as limiting the breadth of the disclosed technology.

An ODBC header file is a file that defines an ODBC interface.

In step 502, document data representing publically available ODBC specification is input into a machine readable interface generator engine, such as a XML interface generator engine.

In step 504, document data representing publically available ODBC header files is input into the machine readable interface generator engine. Some examples of ODBC header files include Odbcinst.h, Sql.h Sqlext.h, Sqltypes.h, Sqlucode.h, Msdasql.h and Msdadc.h.

In step 506, the machine readable interface generator engine processes data representing ODBC specification and data representing ODBC header files. The processing converts data representing ODBC specification and data representing ODBC header files into a machine readable interface document, such as XML interface representing XML representation of data that was input into the machine readable interface generator engine. Upon conclusion of conversion, the machine readable interface generator engine outputs the machine readable interface document.

In step 508, the machine readable interface document is input into a code generation engine.

In step 510, a programming language source code document template is input into the code generation engine. The template is customized and pre-written in order to provide customized functionality. In one embodiment, one programming language source code document template may be pre-written for BAMS ODBC driver and another programming language source code document template may be prewritten an extension driver. In one embodiment, the programming language code document template is written in C++. However, other programming languages may also be used.

In step 512, the code generation engine, such as Extensible Stylesheet Language (XSL) code generation engine, processes the machine readable interface document and the programming language source code document template. The processing generates a customization interface specification document, such as XML representation of a default driver configuration, and a programming language source code document, such as C++ source code of BAMS ODBC driver or an extension driver source code or a Java extension driver and a base class. One example of such code generation engine is XSLTPROC.

In step 514, the code generation engine outputs the customization interface specification document for subsequent use. The customization interface specification document is a configuration document for a default extension driver. An example of the customization interface specification document is illustrated in FIG. 1 as runtime configuration driver 213.1.

In step 516, the code generation engine outputs the programming language source code document is for subsequent use.

In one embodiment, by modifying the code generation engine and programming language source code document template format, complete performance of generic build-time process 500 can generate base class for computer programming languages, such as Java and Python.

Figure 6:
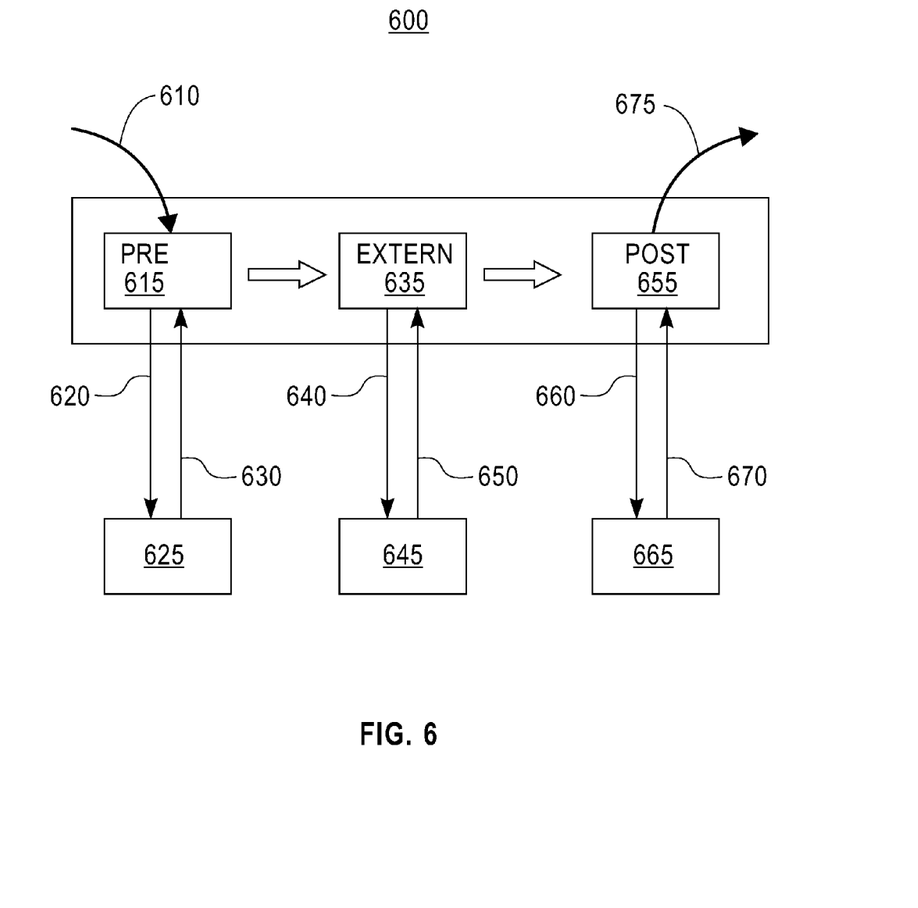
FIG. 6 symbolically shows one example of a framework used for generation of a custom engine execution code according to one embodiment of the disclosed technology.

In one embodiment, as further illustrated in FIG. 6, the disclosed technology, based on the content of the programming language source code document template, is used to write a custom engine execution code by defining structure of the generated methods. Since the source code is generated to establish a connection to a certain computing framework, both sides of the connection, the caller and the callee, are thus generated coherently. Hence, patterns used for interaction between the calling driver, such as a BAMS ODBC driver, and the called driver, such as an extension driver, can be generated.

Since method wrappers can add hidden behavior to a method without recompiling it, they can be used to change a method's behavior. Commonly, method wrappers are used to add behavior before and after the default method executes. Hence, the method wrappers have a pattern that includes three processing steps. First step, a pre step, enables preprocessing of ODBC calls. Second step, an extern step, enables sending requests to downstream system to perform analytical model instantiation. Third step, a post step, enables any post processing not already performed. The pre, the extern and the post steps are configurable such that that any subset can be implemented or kept empty (are pass-through).

In one embodiment, upon receipt of an input with a request for SQL data only and no analytical processing, then the output of the method wrapper may use the pre step to send request to a database via a real database driver and do nothing else except a pass-through of the response through the extern and post steps. In another embodiment, the pre step may be used to send an input SQL data request to a real database via a real database driver, the extern step may be used to send the received data downstream to modeling software and the post step may be used to send the results output from the modeling software back to the requesting entity. In yet another embodiment, upon receipt of SQL input with no data request, but a need to instantiate modeling software, the pre step may extract the relevant modeling software input information and use the extern step to output a request with that information.

FIG. 6 symbolically shows one example of a framework used for generation of a custom engine execution code according to one embodiment of the disclosed technology. As previously described in reference to FIG. 5, the disclosed technology, based on the content of the programming language source code document template, may be used to write a custom engine execution code by defining structure of the generated methods.

In process 600, in step 610, an ODBC compliant request, such as a SQL statement output from a BI platform, is input and ODBC method components are generated. In one embodiment, depending on the contents of the ODBC compliant request, performance of process 600 varies.

In step 615, a pre-processing step, semantic transformation of the ODBC compliant request is performed. Some examples of such transformation input 620 and output 630 into an environment 625 include passing the ODBC compliant request to a real driver; filtering/modifying the ODBC compliant request to remove data that may not be meaningful to a database, but meaningful to modeling software; transforming the ODBC compliant request from a certain database compliant format to an application specific format applicable to modeling software; just passing the ODBC compliant request through to an external processing step.

In step 635, the external processing step, a method call to an external engine and/or a programming language is made. Some examples of such calls input 640 and output 650 into an environment 645 include performing a task of the pre-processing step and a post-processing step; performing a pass-through to the post-processing step; performing an asynchronous call such that the response to the post-processing step is the acknowledgement of the request and subsequently, when the external engine completes its processing, the external processing step will output the processed data to the database or any backend system. In one embodiment, environment 645 is an extension driver, which may be external to the environment on which process 600 is executed.

In step 655, the post-processing step, performance of a task of creating an ODBC compliant response take place. Some examples of such performance input 660 and output 670 into an environment 665 includes a pass-through back to the BI platform; performing some processing on output 650 of the external processing step.

In step 675, the ODBC compliant response is output to the BI platform.

Figure 7:
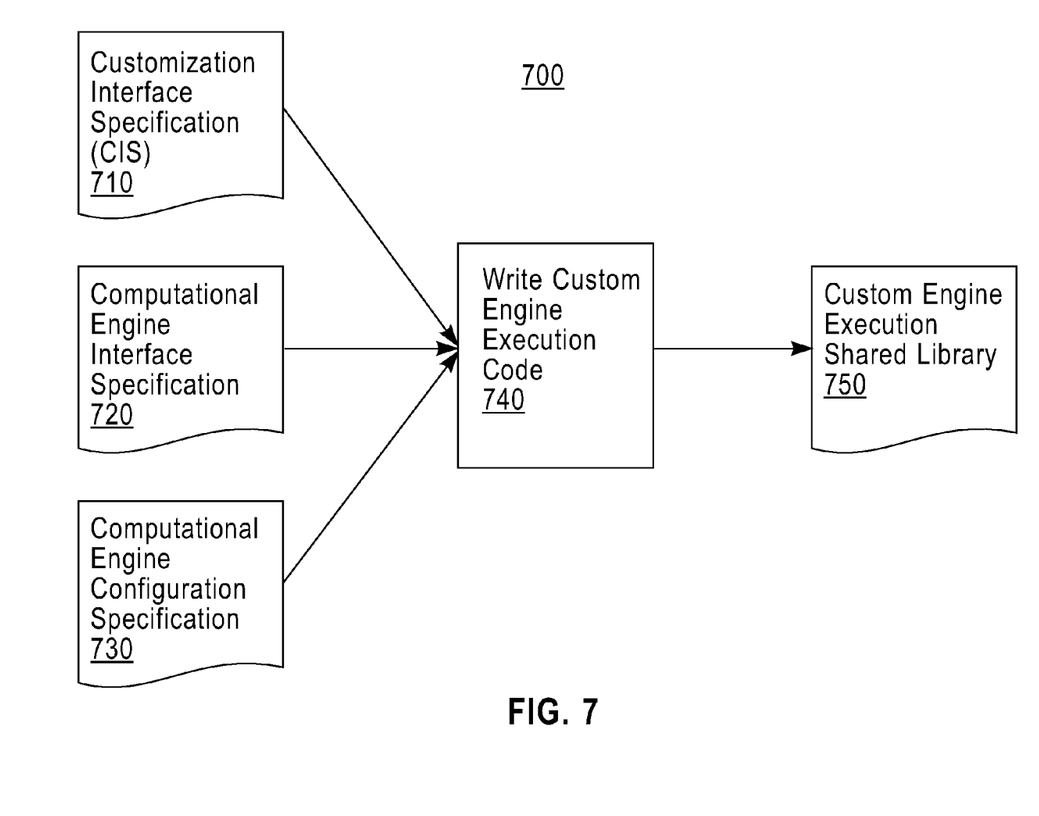
FIG. 7 symbolically shows one example of a generic customization process used for generating a framework used for generation of a custom engine execution code a according to one embodiment of the disclosed technology.

FIG. 7 symbolically shows one example of a generic customization process used for generating a framework used for generation of a custom engine execution code according to one embodiment of the disclosed technology.

A process 700 uses three inputs for its performance. One input is a customization interface specification (CIS) 710, another input is a computational engine interface specification (CEIS) 720 and another input is a computational engine configuration specification (CECS)730.

CIS 710 is identical to customization interface specification document 514 as described in reference to FIG. 5.

CEIS 720 is an interface specification that is unique to an underlying computational engine, which in one embodiment is a functional implementation, such as an airline scheduling or a water-pipe failure prediction system, or a mathematical domain implementation, such as optimization, simulation, data-mining or statistics.

CECS 730 is a configuration specification that defines the structure/meta-data of input of a computational engine. In one embodiment, an instance of the CECS 730 includes the actual data where XSD defines the structure and XML contains the data that follows the XSD structure.

In step 740, custom engine execution code is written. This step involves writing source code to bind the computational engine with CIS 710. In one embodiment, this step is performed by a software developer familiar with the inner working of the computational engine. The software developer may implement the specific methods in CIS 710 using the pre, extern and post methods available in CIS 710 and previously described in reference to FIG. 6. Step 750 reflects generation of a custom engine execution library.

Figure 8:
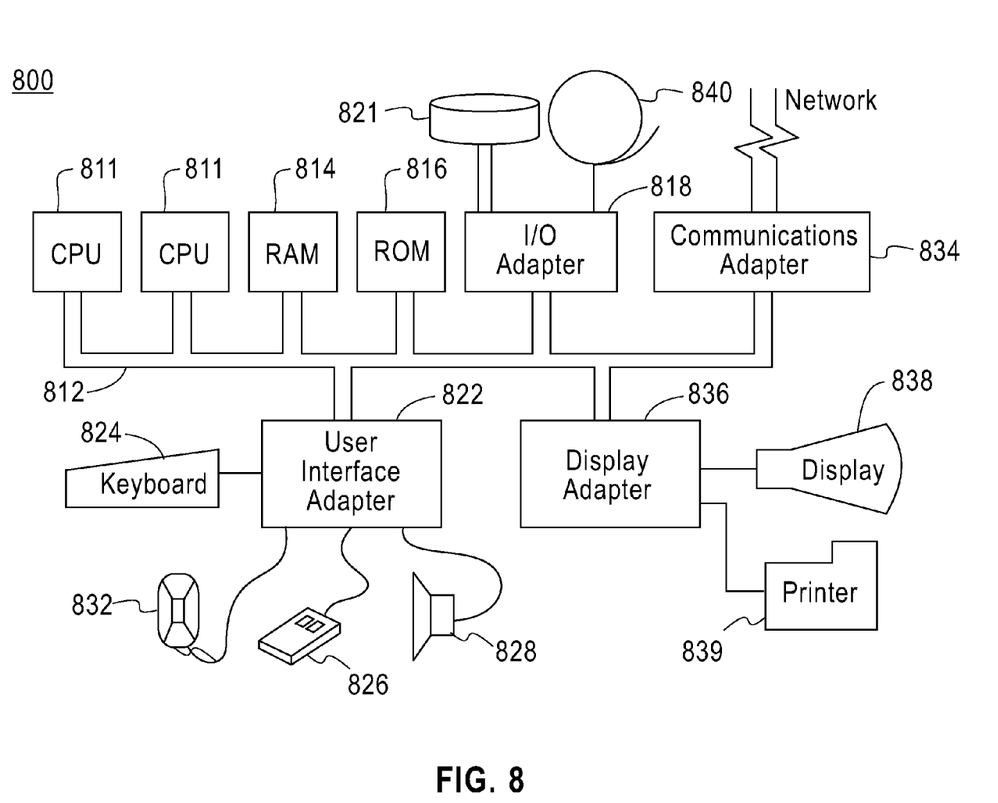
FIG. 8 symbolically shows an exemplary hardware configuration of the computing system 800 that run method steps described in FIGS. 3 and 6-7 according to one embodiment of the disclosed technology.

FIG. 8 illustrates an exemplary hardware configuration of the computing system 800 that run method steps described in FIGS. 3 and 6-7 in one embodiment. The hardware configuration preferably has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting the system 800 to a data processing network, the Internet, an Intranet, a local area network (LAN), etc., and a display adapter 836 for connecting the bus 812 to a display device 838 and/or printer 839 (e.g., a digital printer of the like).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident, software, micro-code, etc.) or an embodiment combining software and hardware aspects that may all generally be referred to herein as a "circuit," "module" or "system."

Furthermore, aspects of the present disclosure may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1 to 8 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the embodiments of the present disclosure have been described in detail, it should be understood that various changes and substitutions can be made therein without departing from spirit and scope of the disclosure as defined by the appended claims. Variations described for the present disclosure can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present disclosure.

Reference in the specification to "one embodiment" or to "an embodiment" means that a particular feature, structure, or characteristic described in connection with the embodiments is included in at least one embodiment. The appearances of the phrase "one embodiment" in various places in the specification are not necessarily all referring to the same embodiment.

The invention claimed is:

1. A computer-implemented method for integrating at least one analytical or modeling driver into an existing business analytic environment, the method comprising:

creating, by computing system including at least one memory device and at least one processor connected to the memory, a BAMS (Business Analytics and Mathematical Sciences) driver, the BAMS driver loading a real database driver associated with a database and redirecting a request from a client application to the real database driver;

generating, by the computing system, an extension driver, the extension driver for providing an interface to a data modeling or processing software and for converting the interface from a software environment compiled by a programming language to another software environment targeted to another programming language, and said extension driver manipulating the request before redirecting the request to the real database driver and post-processing results from the real database driver, the extension driver extending or overriding functionalities of the BAMS driver;

operably coupling, via an interface, the BAMS driver to the extension driver, the interface dynamically loading the associated real and extension drivers;

operably coupling a custom driver to the extension driver, the custom driver being part of the data modeling software; and passing the request, via said custom driver, to the data modeling software that runs multiple scenarios over the request if the results cannot be found in the database, the custom driver implementing a method that calculates the request and outputs the results, wherein the created BAMS driver and the generated extension driver are implemented in the existing business analytic environment without any change made on the existing business analytic environment.

2. The computer-implemented method according to claim 1, further comprising:

acting the BAMS driver as a proxy for a database in the existing business analytic environment.

3. The computer-implemented method according to claim 1, further comprising:

pre-processing the request by the BAMS driver, the pre-processing the request including one or more of: semantic transformation of the request, the filtering or modifying the request, and transforming the request from a certain database complaint format to an application specific format applicable to the data modeling or processing software.

4. The computer-implemented method according to claim 1, further comprising:

configuring the extension driver in runtime to perform one or more of: an analytical execution, a data modeling and a web service.

5. The computer-implemented method according to claim 1, wherein the extension driver further performs one or more of:
- augmenting the result by adding additional tables and columns;
- redirecting the request through protocols and programming languages;
- providing an access to operating system features, the operating system features including one or more: logging, performance monitoring and network and computational services; and
- providing an access to capabilities provided by at least one external data analysis engine.

6. The computer-implemented method according to claim 1, wherein the creating the BAMS driver and the creating the extension driver include steps of:
- receiving at least one document that defines an interface of the database;
- receiving at least one header file for the interface of the database;
- running a machine readable interface generator engine with the document and the header file and convert the document and the header file into a machine readable interface document;
- receiving a programming language source code template for the BAMS driver and the extension driver;
- running a source code generation engine with the programming language source code template and the machine readable interface document;
- outputting, from the source code generation engine, a configuration document of the BAMS driver and the extension driver to determine runtime configuration and features of the BAMS driver and the extension driver; and
- outputting, from the source code generator engine, source code of the BAMS driver and source code of the extension driver.

7. The computer-implemented method according to claim 1, wherein the defined document is written by XML (Extensible Markup Language), the machine readable interface generator engine includes a XML interface generator engine, and the machine readable interface document is represented by XML, and the source code generator engine includes XSL (Extensible Stylesheet Language) code generation engine.

* * * * *

UNITED STATES PATENT AND TRADEMARK OFFICE
CERTIFICATE OF CORRECTION

PATENT NO. : 8,826,248 B2  
APPLICATION NO. : 13/597737  
DATED : September 2, 2014  
INVENTOR(S) : Michael Adendorff et al.

Page 1 of 1

It is certified that error appears in the above-identified patent and that said Letters Patent is hereby corrected as shown below:

On The Title Page, item (*) Notice should read –

(*) Notice: Subject to any disclaimer, the term of this patent is extended or adjusted under 35 U.S.C. 154(b) by 0 days.

This patent is subject to a terminal disclaimer.

Signed and Sealed this
Seventeenth Day of March, 2015

Michelle K. Lee
*Director of the United States Patent and Trademark Office*